United States Patent [19]

Magnusson et al.

[11] Patent Number: 5,126,044
[45] Date of Patent: Jun. 30, 1992

[54] IODINE RESIN/CARBON WATER PURIFICATION SYSTEM

[76] Inventors: Jan H. Magnusson; Kristofer J. Magnusson, both of 117 Wild Wood Beach Rd., Mahtomedi, Minn. 55115

[21] Appl. No.: 589,066

[22] Filed: Sep. 27, 1990

[51] Int. Cl.⁵ .............................................. B01D 24/08.
[52] U.S. Cl. ................................. 210/282; 210/287; 210/288; 210/290
[58] Field of Search ............... 210/266, 282, 287, 288, 210/290, 279

[56] References Cited

U.S. PATENT DOCUMENTS

| | | | |
|---|---|---|---|
| 325,681 | 9/1885 | Lindon | 210/266 |
| 903,070 | 11/1908 | Farnell | 210/290 |
| 1,287,755 | 12/1918 | Rorer | 210/449 |
| 1,774,004 | 8/1930 | Haslett | 210/449 |
| 2,670,081 | 2/1954 | Quinn | 210/266 |
| 2,973,097 | 2/1961 | Snider | 210/288 |
| 3,152,077 | 10/1964 | Kryzer | 210/282 |
| 3,262,570 | 7/1966 | Gailitis et al. | 210/266 |
| 3,289,847 | 12/1966 | Rothemund | 210/266 |
| 3,342,340 | 9/1967 | Shindell | 210/282 |
| 3,529,726 | 9/1970 | Keenan | 210/282 |
| 3,715,035 | 2/1973 | Teeple, Jr. et al. | 210/282 |
| 3,744,639 | 7/1973 | Teeple, Jr. et al. | 210/282 |
| 3,815,747 | 6/1974 | Clack et al. | 210/288 |
| 4,298,475 | 11/1981 | Gartner | 210/266 |
| 4,561,976 | 12/1985 | Houser | 210/290 |
| 4,635,663 | 1/1987 | Rollins et al. | 210/282 |
| 4,711,723 | 12/1987 | Bray | 210/266 |
| 4,769,143 | 9/1988 | Deutsch et al. | 210/266 |
| 4,824,565 | 4/1989 | Middleton | 210/449 |
| 4,995,976 | 2/1991 | Vermes et al. | 210/266 |
| 5,024,764 | 6/1991 | Holler | 210/266 |

Primary Examiner—Stanley S. Silverman
Assistant Examiner—Cynthia L. Nessler
Attorney, Agent, or Firm—Douglas L. Tschida

[57] ABSTRACT

Water treatment apparatus including an iodine resin purification bed supported in a walled structure and mounted upstream of an active carbon filtration bed. In one disposable cartridge construction, a replacable, toroidal sediment filter surrounds the purification chamber which concentrically projects from the upstream end of a larger diameter active carbon bed. In another construction, the purification bed includes a directionally permeable, replaceable, pointed housing which insertably mounts within the carbon bed. In another construction a portable housing contains a purification bed within a surrounding carbon bed, and receives water from faucet coupling means and includes a nozzle. In still another personal construction, a purification cartridge mounts between a pressurizable collector and canteen.

11 Claims, 6 Drawing Sheets

5,126,044

IODINE RESIN/CARBON WATER PURIFICATION SYSTEM

BACKGROUND OF THE INVENTION

The present invention relates to water purification and filtration systems and, in particular, to a system including an iodine resin purification bed.

Along with expanding populations and industrialization has come an ever expanding problem of water pollution, either by way of chemical or microbial contaminants (i.e. bacterial, viral or parasitic). Natural sources of potable drinkable water are proportionately decreasing, thus requiring various processing treatments to make the water consumable.

Varieties of techniques have been developed in the latter regard at the bulk treatment levels for large populations, as well as for small volumes for an individual or household. These methodologies may include varieties of mechanical treatment systems and/or chemical treatments, but which systems suffer from various shortcomings. For example, distillation systems, while producing substantially contaminant free re-constituted water, does so at the loss of naturally occurring minerals. These systems are also slow and require large amounts of energy. Chemical treatment systems, similarly, are costly and/or leave residual tastes in the treated water.

Filtration systems and, in particular, granulated active carbon (GAC) systems, otherwise, economically remove a wide variety of relatively small contaminants. The beds do not however remove various viral and bacterial contaminants which can collect and grow within the carbon beds, thus necessitating the re-charging of the beds or costly treatment thereof to remove the undesired contaminants. Agencies responsible for large installations, as well as approval regulators for smaller installations, have accordingly begun to withhold approval for such systems.

One approach in the small volume treatment market has been to interject, upstream of the GAC, a purification element for devitalizing (e.g. sterilizing or killing) specific viruses and bacteria, prior to entering the bed. Such purification elements may also be mounted downstream of the bed to prevent reverse contamination. One cartridge system known to Applicants utilizing an iodine resin purification bed is sold by Water Technologies, Inc., Plymouth, Minn.

The cartridges of this system particularly includes a GAC bed and a co-axially aligned resin bed of equal cross-sectional flow area containing polystyrene beads to which are bonded iodine molecules. This resin is described in U.S. Pat. No. 4,238,477 and has proven effective in destroying the viral, bacterial and parasitic contaminants, when deposited to a bed depth sufficient to provide proper contact time between the resin and water.

Although effective in practice, the foregoing cartridges have proven to be economically rather expensive to produce, due to the use of excessive amounts of resin. That is, the resin bed portion of the cartridges have been constructed oversize relative to the life of the GAC bed, in lieu of adjusting the cartridge housing configuration. Although, too, a certain contact time is required between the water and purification bed to assure removal of undesired contaminants, presently available cartridges only provide a bed depth of approximately ⅜ inches.

Applicants have determined, however, that smaller volumes of purification media can be used without effecting the cartridge properties. In particular, the cross-sectional flow area of the purification bed need not be the same as the adjacent GAC bed. The length of the purification bed can also be increased without constricting throughout flow, among other improvements which better match the effective resin life and volume to that of the GAC bed.

In appreciation of the foregoing, Applicants have developed various systems, and purification/filtration cartridges and assemblies which are more economical to manufacture via a lengthening and downsizing of the volume of iodine purification resin material, while still maintaining proper contact time between the resin and water and without effecting the throughput rate.

SUMMARY OF THE INVENTION

It is accordingly a primary object of the present invention to provide a volumetrically downsized resin bed of increased length which is co-axially aligned upstream of a bed of GAC particulate media.

It is a further object of the invention to provide a flow directing containment chamber which facilitates sufficient resin contact time between the resin and water without effecting throughput rate.

It is a further object of the invention to provide improved disposable cartridges and housings which are useable with installed systems.

It is a further object of the invention to provide cartridges with replaceable sediment filters which surround a purification bed portion of a housing and in combination with the GAC bed provide a cylindrical housing shape.

It is a further object of the invention to provide a portable, personal assembly for use when traveling with available water faucets.

It is a yet further object of the invention to provide a replaceable purification bed compatible with renewable GAC bed systems.

It is a still further object of the invention to provide a pressurizable canteen filling system including a disposable cartridge and squeeze bag.

Various of the foregoing objects, advantages and distinctions of the invention are particularly achieved in variously considered constructions which are described below. In various of these constructions, a GAC containing cartridge includes a co-axial iodine resin purification chamber exhibiting a cross sectional flow area less than that of the GAC chamber, yet providing a lengthened resin bed depth sufficient to provide proper contact time with the water. The purification chamber can mount ahead of or extend into the GAC chamber. A replaceable, torroidal sediment filter can also surround the purification chamber.

In a personal, transportable construction, means are provided for coupling a housing containing cylindrically concentric purification and GAC beds to an available water supply. The purification chamber for this assembly cylindrically projects from an inlet endcap into the GAC bed chamber and includes integral filters. A nozzle extends from an outlet endcap.

In a refillable or disposable GAC bed cartridge construction, a housing manifold is formed to support a purification chamber including a pointed, multi-apertured endcap. Sediment filters mount interiorly and in concentric external relation to the purification chamber.

In canteen filling construction. a pressurizable collection reservoir (e.g. a squeeze bag or bottle) couples to a purification cartridge which, in turn. is securable to a canteen. Contaminated water can thereby be gravity fed or forced through the cartridge.

Still other objects, advantages, distinctions and constructions of the invention will become more apparent hereinafter upon reference to the following detailed description with respect to the appended drawings. Before referring thereto, it is to be appreciated the description is made by way only of presently preferred constructions and considered alternative improvements and modifications thereto. The description should therefore not be interpreted in limitation of the invention. Rather, the invention should be interpreted within the spirit of the following appended claims.

DESCRIPTION OF THE PREFERRED EMBODIMENT

Figure 1:
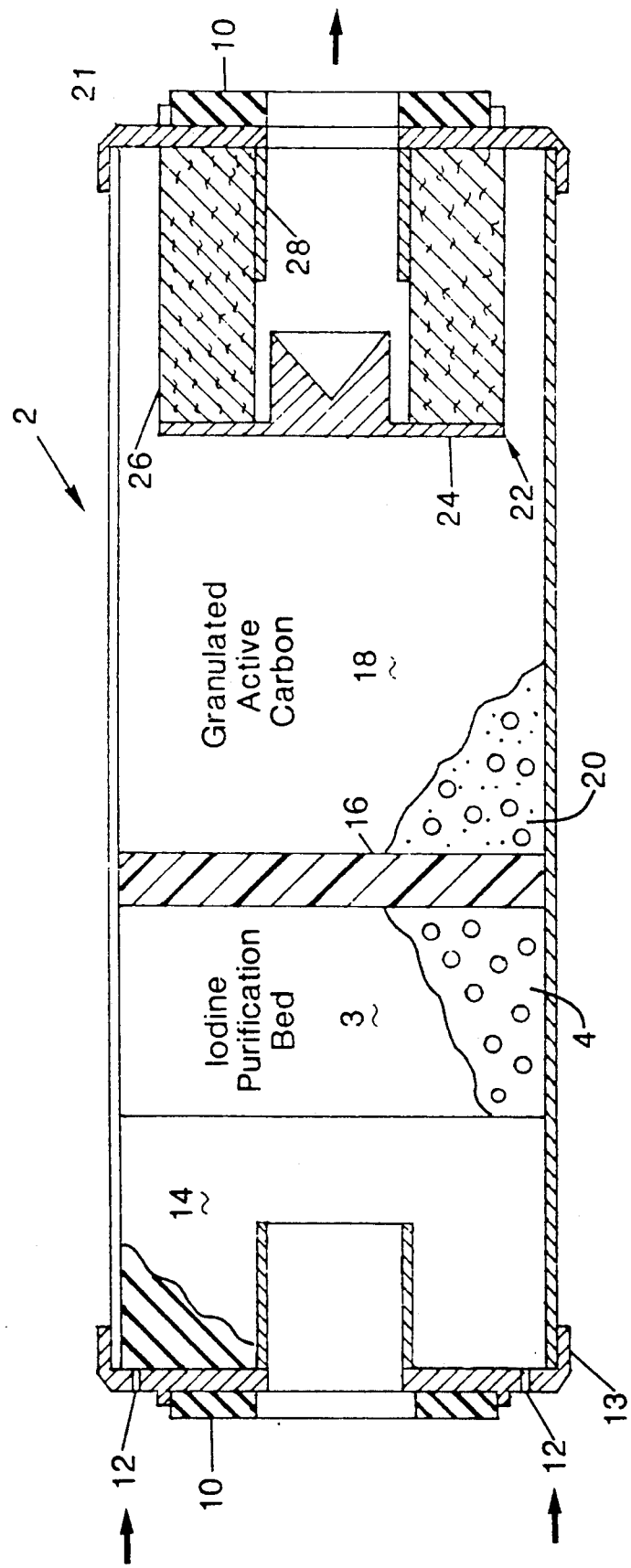
FIG. 1 shows a cross sectional view through a prior art cartridge.
Figure 5:
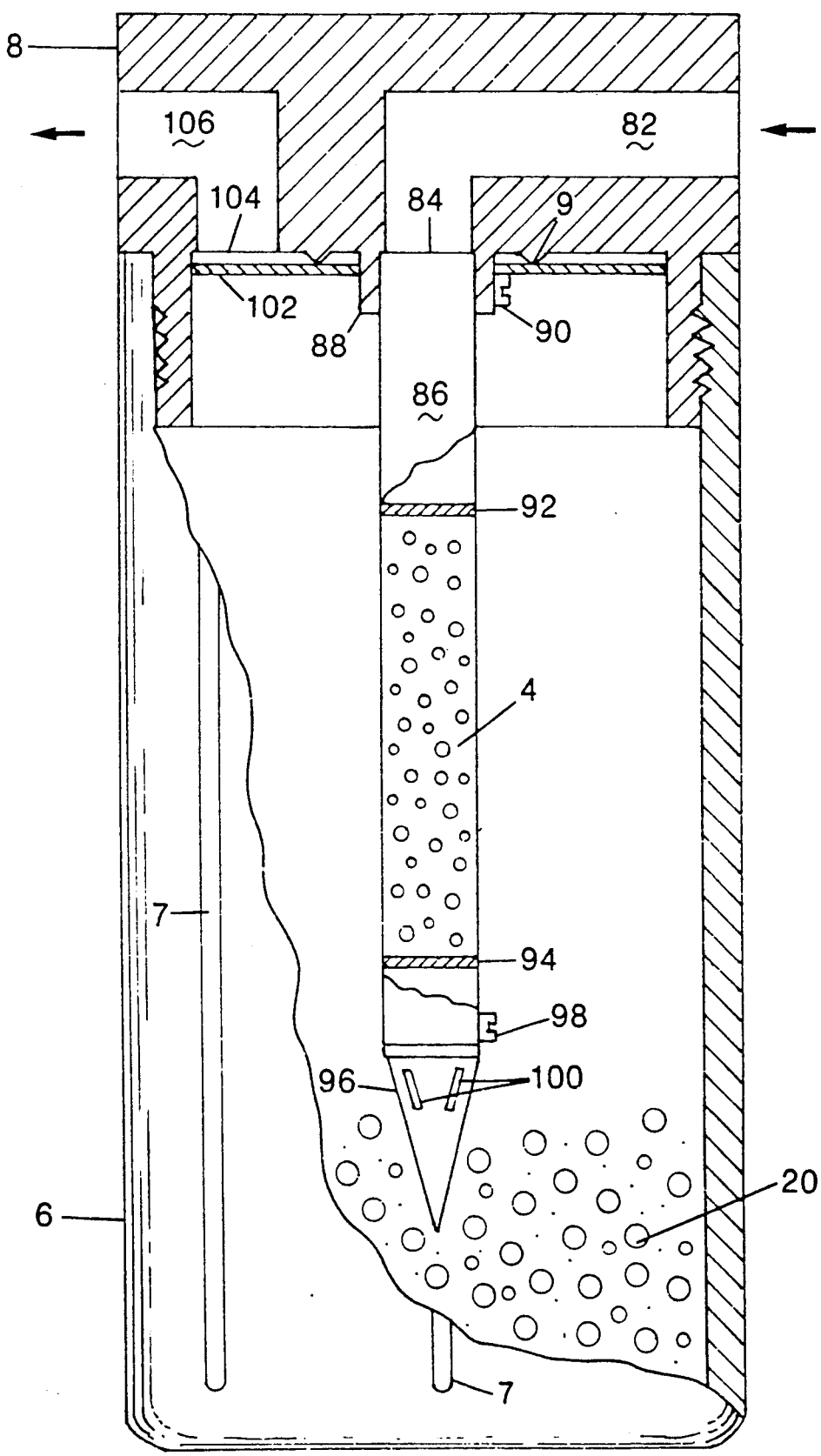
FIG. 5 shows a partially sectioned elevation view though a cartridge system including a rechargeable GAC.

With attention to FIG. 1, a cross section elevation view is shown though a prior art cartridge filter 2 including a purification bed 3 of packed iodine bonded resin beads 4. The latter resin beads are more particularly described in U.S. Pat. No. 4,238,477. Such a cartridge 2 is mountable within a variety of molded housings which find application for household drinking water. These systems typically provide a usable cartridge life of 1,000 to 1,500 gallons between cartridge changes. An example of the configuration of one housing 6 which is useable with cartridges or with a refillable carbon particulate is shown in FIG. 5. Such housings 6 are typically formed of a high density molded plastic or fiberglass composite and are configured with longitudinal ribs 7 to withstand water pressures on the order of 150 psi.

The cartridge 2 otherwise provides a cylindrical construction and mounts within the housing 6 in sealed flow relation to an end mounted inlet/outlet manifold 8 and the housing bottom via a pair of rubber annular washers 10. The washers 10 are sealed to the housing 6 and manifold 8 via annular V-shaped ridges 9 (only one of which is shown) which project from the manifold 8 and bottom of the housing 6.

Water flow (shown at the darkened arrows) is directed into the cartridge 2 via a plurality of ports 12 formed within an inlet endcap 13 and through a foam sediment filter 14 (shown in partial cutaway) to the purification bed. A relatively high density annular, disklike filter or screen 16, which exhibits an approximate 150 micron pore size, is positioned at the downstream end of the purification bed 3 to contain the resin beads 4. The resin beads 4 are filled to an approximate depth of $\frac{3}{4}$ inches which relative to an equal diameter, carbon bed 18 provides sufficient contact time to kill parasitic, bacterial and viral contaminants within the water.

The water otherwise flows from the iodine purification bed 3 through the granulated active carbon (GAC) bed 18 (shown in partial cutaway), which contains granules of carbon 20, and exits the cartridge 2 at an end cap 21 and fibrous post-filter assembly 22 where carbon particulate is filtered from the water. The post-filter assembly comprises an end support 24, cylindrical filter 26 and internal bore ring 28. The GAC bed 18 in addition to filtering contaminants also filters iodine molecules from the water, which might otherwise cause a corresponding taste.

Although the cartridge 2 has proven to be functional for its intended purpose, it is relatively expensive to produce in view of the volume of resin required to provide the necessary purification bed depth and contact time relative to the interior diameter of the cartridge 2. Appreciating however that the resin 4 has an effective life greater than the GAC material (i.e. on the order of four times that necessary). Applicants have developed a number of improved cartridge constructions which provide an iodine resin purification chamber of reduced cross sectional area and volume relative to the GAC bed 18. These constructions also provide increased bed depths to promote sufficient contact time between the water and iodine and without restricting the flow rate.

Figure 2:
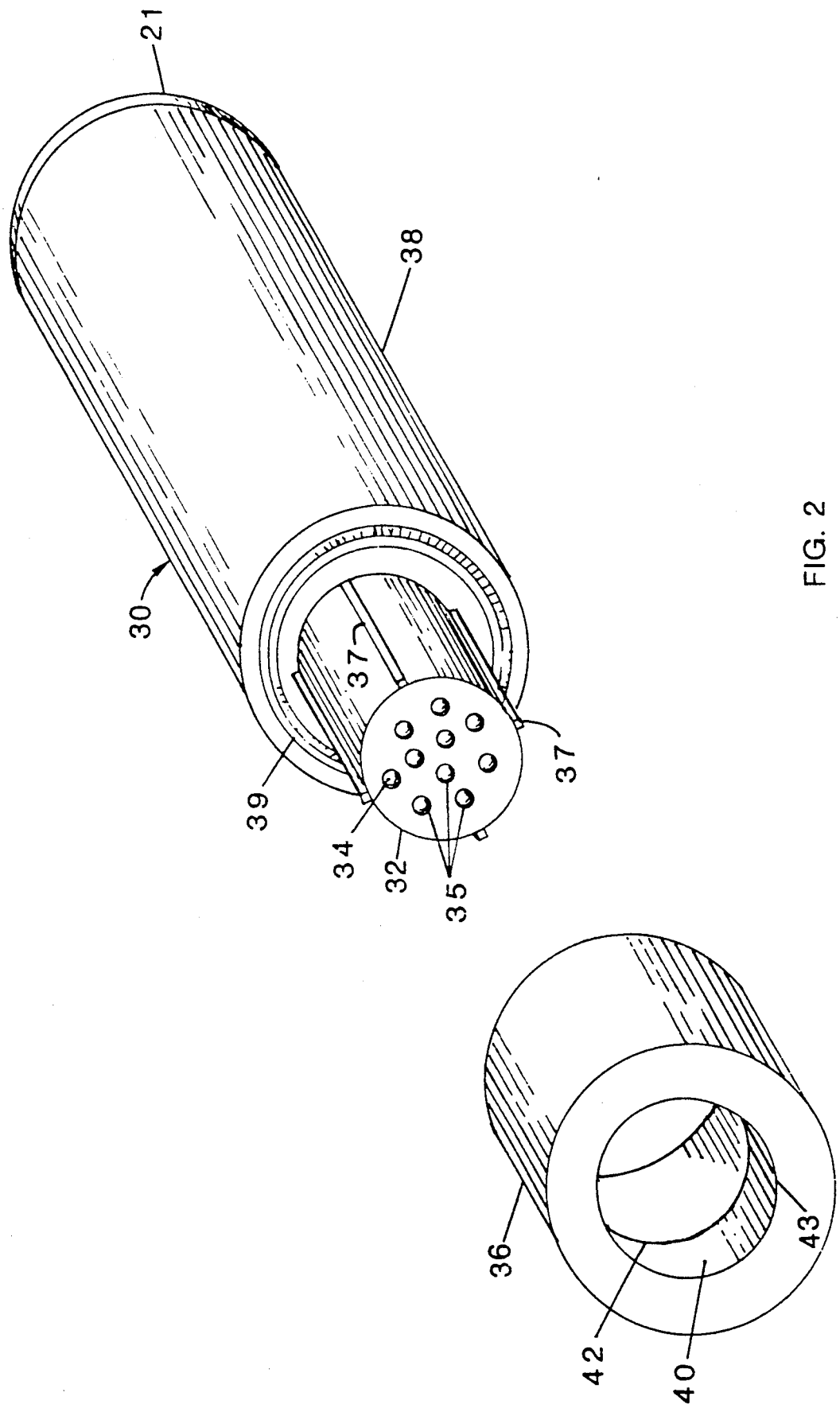
FIG. 2 shows an isometric drawing of an improved cartridge construction including a replaceable sediment filter.
Figure 3:
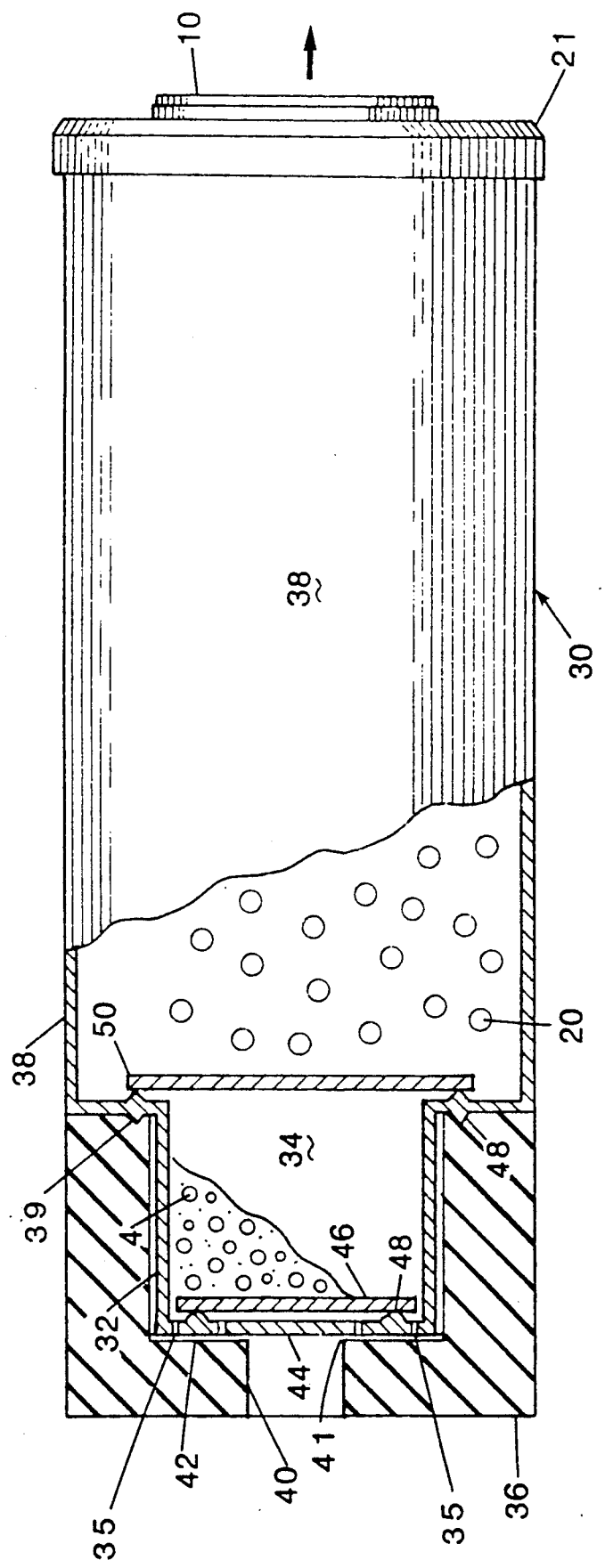
FIG. 3 shows a partially sectioned view through the cartridge of FIG. 2.

In this regard, attention is directed to FIGS. 2 and 3 and wherein a disposable GAC cartridge 30, similar to that of FIG. 1 but with some exceptions, is shown. Dimensionally the cartridge 30 is constructed to fit housings 6 of the type which receive cartridges 2 like those shown in FIG. 1. In lieu however of the internal purification chamber 3, a reduced radius purification chamber 32 projects from the inlet side of the GAC chamber and wherein a resin bed 34 containing the resin beads 4 is supported. A plurality of apertures 35 and spacer ribs 37 to flow access to the bed 34.

A replaceable torroidal shaped filter 36 mounts about the purification chamber 32 and spacer ribs 37. It is formed of a relatively solid, porous material and filters particulates less than 10 microns. By making the sediment filter 36 separately replaceable, the overall life of the cartridge 30 is extended. The throughput capabilities are also improved, since the water flow over time does not experience partial filter plugging, such as with the cartridge 2 and wherein the foam sediment filter 14 typically becomes plugged. The end of the filter 36 is compressively sealed to an annular V-shaped ring 39 which protrudes from the forward wall of the GAC chamber 38.

More of the details of the construction of the purification chamber 32 and the mounting of the sediment filter 36 thereto can be seen in FIG. 3. It is to be appreciated that the construction of the GAC chamber 38 is substantially the same as that shown in FIG. 1, although of a larger volume, and includes the GAC bed material 20, post-filter assembly 22 (not shown) and endcap 21.

The replaceable sediment filter 36 otherwise exhibits an external diameter approximating that of the GAC chamber 38. An internal, stepped bore 40 having a ledge 42 mounts about the purification chamber 32 and spacer ribs 37 and is sized to extend forward of the purification chamber to create a space or gap 41. The aft end abuts the seal 39 and GAC chamber 38.

The purification chamber 32 otherwise exhibits a length of approximately 1½ to 2 inches. The volume of contained resin 4 (which is shown in partial cutaway) is otherwise reduced and is approximately thirty percent of that used for the same overall sized cartridge of FIG. 1. This reduced volume provides a cost saving and better matches the useful life of the GAC particulate 20, which has been increased in volume, to that of the iodine resin 4. Comparative tests have further corroborated that the water purity and useful cartridge life for similarly sized cartridges has improved with the reduction in resin volume. In particular the cartridge 30 provides a purity of $2.5 \times 10^9$ ppm for the cartridge 2.

Separately bonded to the resin chamber 32 interiorly of the inlet port 44 is a porous filter or screen disc 46 which is sonically bonded to the chamber end at an annular projection 48. A downstream porous disk 50 is similarly bonded to an annular projection 48 at the interior forward face of the GAC chamber 38. In lieu of a sonic bond, it is to be appreciated a variety of other adhesives and plastic bonding techniques can be utilized to bond the disks 48, 50 to the cartridge chambers 32, 38. The resin 4 is otherwise contained between the impermeable outer chamber walls and the porous disks 48, 50 to the desired depth and reduced volume.

Figure 4:
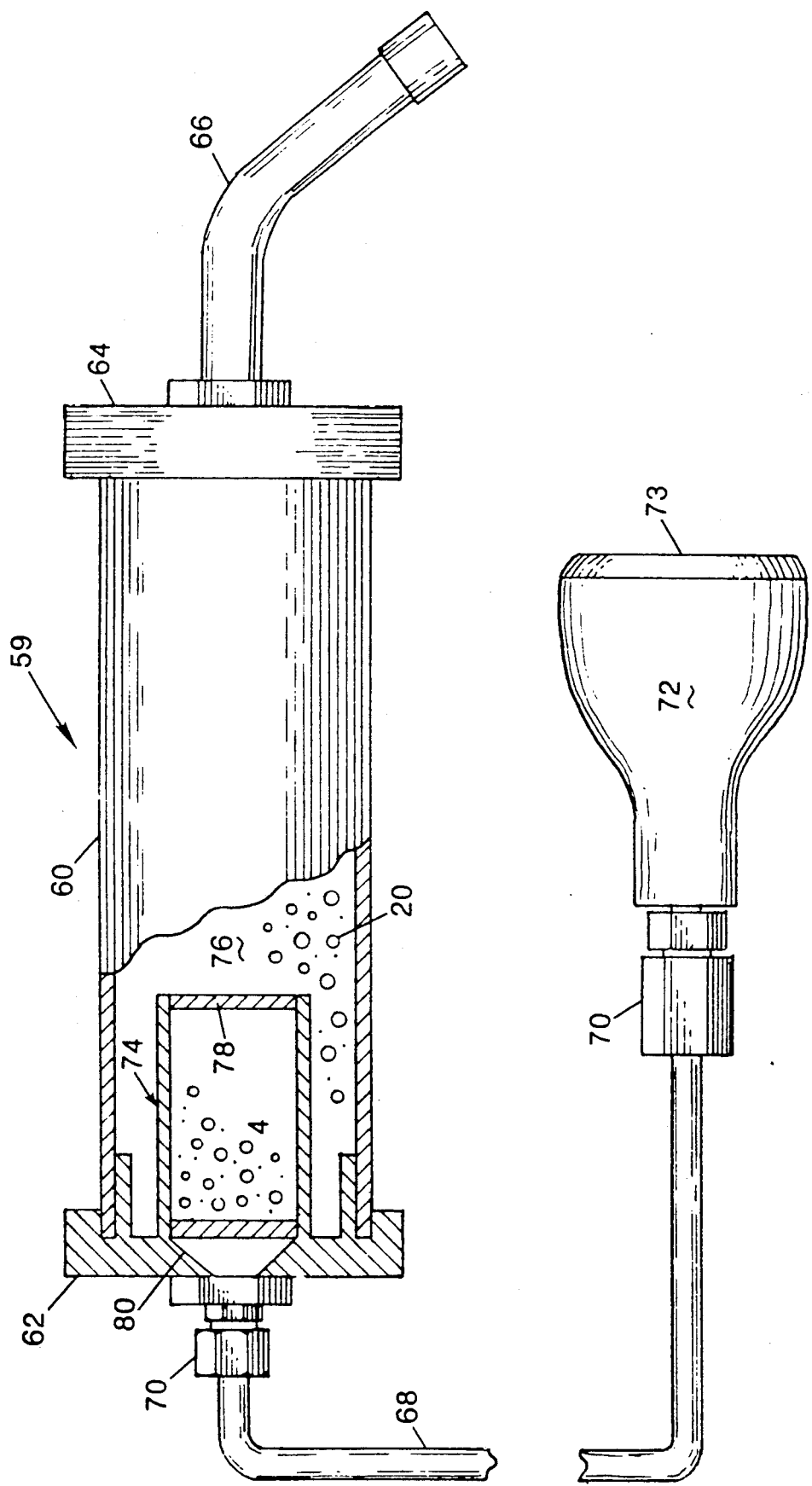
FIG. 4 shows a partially sectioned elevation view though a personal, transportable filtration system.

Appreciating that the resin chamber 32 might also extend interiorly of the GAC chamber 38, attention is directed to FIG. 4 which discloses an assembly 59 that finds particular advantage, such as when traveling, for individuals who desire a private filtration system. Such a system is usable with conventional water supplies, similar to those found in hotels, motels and the like. Thus, the assembly 59 is readily mountable to a faucet and not only filters macro sized contaminants from the water, but also purifies the water of any viral or bacterial contaminants.

The assembly 59 includes a cylindrical housing 60 containing inlet and outlet endcaps 62, 64 and relative to which the inlet endcap 62 and purification chamber 74 are shown in partial cross section. A formed or bent nozzle 66 extends from the outlet endcap 64. Secured to the inlet endcap 62 is a length of tubing or hose 68 which is coupled to the inlet endcap 62 via a threaded, draw-type connector assembly 70. The opposite tube end is coupled to another connector assembly 70 and a flexibly resilient faucet coupler 72. The faucet coupler 72 is formed of an elastomer material and provides an inwardly tapered orifice (not shown) which fits over most available faucets that might be encountered in a person's travels. Although a friction fit coupler 72 is shown, it is to be understood that a coupler assembly using a band fastener or threaded faucet coupler could also be used to advantage.

Upon fitting the coupler 72 over a faucet, the water is directed to the iodine resin purification chamber 74 which extends interiorly from the inlet endcap 62 and into the GAC chamber 76. A pair of porous disks 78 contain the iodine resin material 4 within the chamber 74. These disks 78 are sonically or adhesively bonded to the chamber 74 to withstand the typical pressures encountered relative to water entering a flared inlet port 80.

A further example of an iodine resin purifier which finds application with filtration housings 6 including a replaceable GAC bed is shown in FIG. 5. For the disclosed mounting, a replaceable GAC particulate 20 is used in conjunction with an inlet/outlet manifold 8 that screw couples to the GAC housing 6 in a reverse flow fashion. That is, the normal inlet, when used with replaceable cartridges 2, becomes the outlet for purposes of the inventive arrangement of FIG. 5. Thus, the inlet channelway 82 channels water to a center port 84 and an elongated replaceable candle-like purification chamber 86 which contains the iodine resin 4. The purification chamber 86 is suspended from the manifold 8 at a slipfit connector 88 and is secured thereto via a setscrew 90.

Shown in cutaway and contained within the chamber 86 between a pair of porous annular disks 92, 94 is the resin material 4. a bed length on the order of four inches is provided. Otherwise, a separate pointed, endcap 96 is secured via a second setscrew 98 to the outflow end of the purification chamber 86. The endcap 96 exhibits a conically pointed profile and includes a plurality of flow apertures 100. Other pointed profiles may be used with equal efficacy.

The pointed profile particularly facilitates mounting of the purification chamber 86 within the GAC particulate 20. That is, when the GAC particulate 20 is periodically changed, it is necessary to unscrew or remove the outer housing 6, dispose or clean the old particulate and insert new particulate. The rejuvenated particulate 20 and housing 6 is then brought to bear against the purification chamber 86 and the purification chamber is slowly inserted into the GAC particulate 20, prior to the housing 6 being screwed onto the manifold 8. A porous end washer 102 otherwise separates the GAC material 20 from the outlet port 104 and the outlet channelway 106 of the manifold 8. The annular V-shaped ring 9 seals to the washer 102.

Figure 6:
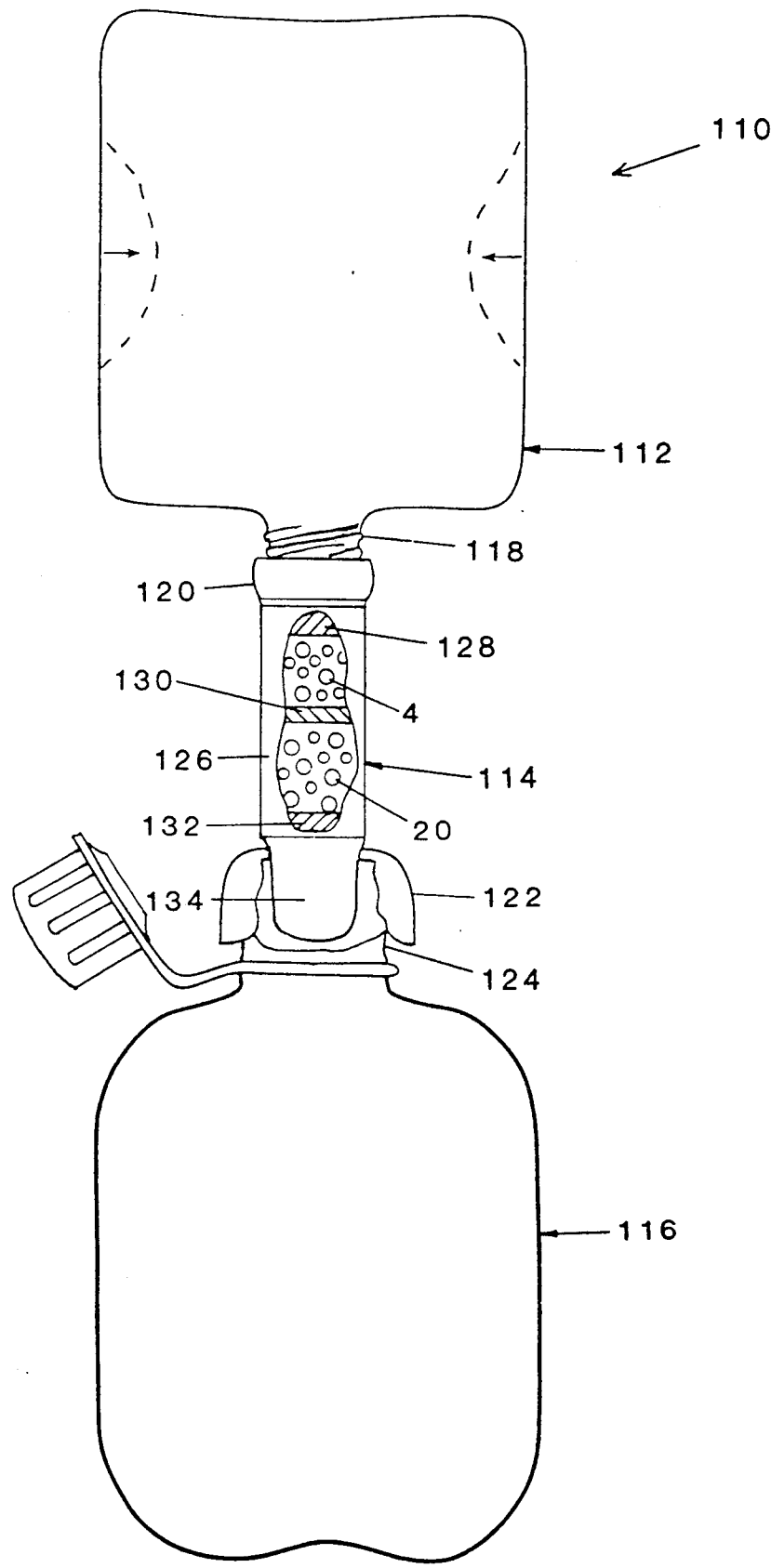
FIG. 6 shows a partially sectioned assembly drawing of a canteen filling/purification system.

Still another construction of the invention is disclosed in FIG. 6 and wherein an assembly 110 is shown in partial cutaway which finds application for military or recreational use. Specifically, a modular canteen filtration system is disclosed which comprises a squeeze bottle or bag 112, a purification/filtration cartridge 114 and a conventional canteen 116.

For this assembly, a relatively sturdy, flexible bag 112 or polyethylene type bottle is used to collect water which may be contaminated. This water can be collected at the individual's convenience for subsequent or immediate purification. A threaded nozzle portion of the bottle mounts to a mating coupler 120 of the purification/filtration cartridge 114. The cartridge 120, in turn, threadably couples at a collar seal 122 to the spout 124 of a canteen or other personal water storage device 116.

Referring to the cutaway portion of the purification chamber 114, it is generally constructed in the shape of a cylindrical housing 126 and provides for a suitable porous pre-filter 128 which mounts adjacent the coupler 122 and typically comprises a relatively rigid disk-like wafer. An appropriate volume of iodine containing resin bed material 4 is next provided and contained between the pre-filter 128 and a down stream porous divider filter 130. An appropriate volume of GAC material 20 and a suitable disk post filter 132 complete the interior construction of the cartridge 114.

Otherwise, a nozzle portion 134 provides a smooth walled, blunt outlet port which is insertable into the spout of the canteen 116. The surrounding, threaded collar 122, which is secured in water tight relation to the cartridge 114 via sealing arrangement (not shown), is securable to the canteen 116.

Purification and filtration are achievable via a gravity flow of the water through the cartridge, which flow may be augmented via a vent hole (not shown) in the canteen coupler 122. Otherwise, upon squeezing the water bag 112, external pressure may be developed to facilitate flow through the cartridge 114. Where a bag type collector chamber is used, the bag may be rolled as it is evacuated and whereby a sustainable pressure may be maintained relative to the cartridge. Depending upon a desired useful cartridge life, the dimensions of the cartridge 114 can be suitably tailored to accommodate corresponding amounts of purification resin 4 and GAC bed material 20.

While the present invention has been described with respect to variously considered constructions, along with various improvements and modifications thereto, it is to be appreciated that still other constructions may suggest themselves to those of skill in the art. Accordingly, it is contemplated the following claims should be interpreted to include all those equivalent embodiments within the spirit scope thereof.

What is claimed is:

1. A water treatment assembly comprising:
 a) a cylindrical housing having liquid impermeable sidewalls which define a cavity between an inlet port and an outlet port in flow communication with the cavity, wherein said cavity comprises a first chamber and a second chamber and wherein said first chamber projects from a forward portion of said second chamber and radially extends along a common longitudinal axis at a first radius less than a second radius of said second chamber and wherein said second chamber exhibits a volume greater than said first chamber;
 b) an iodine particulate disposed in said first chamber;
 c) a granulated active carbon particulate disposed in said second chamber;
 e) porous means for respectively separating and confining the iodine and carbon particulates within said first and second chambers; and
 f) detachable filter means concentrically mounted about an outer surface of said first chamber for filtering liquids admitted to the inlet port and wherein the outer surface of said filter means radially extends at said second radius and is co-extensive with said second chamber.

2. Apparatus as set forth in claim 1 wherein said first chamber includes a plurality of projections which radiate from an outer surface, wherein said detachable filter means comprises a cylindrical body having an endwall including an aperture which aligns with the inlet port and a bore which mounts about the projections of the first chamber.

3. Apparatus as set forth in claim 2 including an annular projection which extends from an endwall of the second chamber and to which projection the detachable filter means compressively conforms.

4. Apparatus as set forth in claim 1 wherein the volume of said first chamber is sized in a range from five percent to fifteen percent of said second chamber.

5. Apparatus as set forth in claim 1 wherein said iodine particulate comprises a polymer resin of pentavalent iodine particles.

6. Water purification apparatus comprising:
 a) a housing having liquid impermeable sidewalls which define a cavity between an inlet and an outlet port in flow communication with the cavity;
 b) an inlet endcap mounted to said housing at said inlet port and including an integral chamber mounted to said inlet endcap which extends into the cavity;
 c) an iodine particulate disposed in said chamber;
 d) a granulated active carbon particulate disposed in said cavity;
 e) porous means for separating said iodine particulate within the chamber from said carbon particulate within said cavity;
 f) an outlet endcap mounted to said housing at said outlet port and including a tubular nozzle mounted to said outlet endcap and projecting in alignment therewith; and
 g) means for coupling water from a water supply faucet to said inlet endcap;

7. Apparatus as set forth in claim 6 wherein said coupling means comprises an elastomer member having a bore portion which compressively mounts about a water faucet and conduit means secured to said elastomer member and said inlet endcap for conveying water therebetween.

8. Fluid treatment apparatus comprising:
 a) a liquid impermeable housing including (1) a manifold having inlet and outlet ports secured in flow communication with a liquid supply system, (2) a hollow chamber containing a renewable granulated active carbon particulate, and (3) means for coupling said chamber to said manifold;
 b) a tubular housing extending from said manifold into said hollow chamber and including liquid impermeable sidewalls, an endcap having a pointed forward surface containing a plurality of through apertures, and means for securing said endcap to said tubular housing;
 c) an iodine particulate and means for containing the iodine particulate within a bore of said tubular housing; and
 d) means for securing said tubular housing to said manifold in flow communication with the inlet port, whereby liquids are purified and filtered upon passage through said tubular housing and said chamber.

9. A water treatment assembly comprising:
 a) a cylindrical housing having liquid impermeable sidewalls which define a cavity between an inlet port and an outlet port in flow communication wit the cavity, wherein said cavity comprises a first chamber and a second chamber and wherein said first chamber projects from a forward portion of said second chamber and radially extends along a common longitudinal axis at a first radius less than a second radius of said second chamber, wherein said first chamber includes a plurality of projections which radiate from an outer surface, and wherein said second chamber exhibits a volume greater than said first chamber;
 b) an iodine particulate disposed in said first chamber;
 c) a granulated active carbon particulate disposed in said second chamber;
 e) porous means for respectively separating and confining the iodine and carbon particulates within said first and second chambers;
 f) detachable filter means having an endwall including an aperture which aligns with the inlet port and a bore which concentrically mounts about the projections of the first chamber for filtering liquids admitted to the inlet port and wherein the outer surface of said filter means radially extends at said second radius and is coextensive with said second chamber; and g) means projecting from an endwall of the second chamber for retaining the detachable filter means thereto.

10. Water purification apparatus comprising:
a) flexible water containment means;
b) an impermeable housing having an inlet port concentrically aligned with a threaded inlet coupler portion and an outlet port concentrically aligned with a nozzle portion of said housing, wherein said nozzle portion is insertable within a canteen and includes a radially projecting threaded collar which is rotatable about said nozzle portion and wherein said inlet coupler mates with a threaded connection of said containment means;
c) an iodine particulate disposed in a first chamber of said housing;
d) a granulated active carbon particulate disposed in a second chamber of said housing; and
e) porous means mounted in a bore of said housing for separating the iodine and carbon particulate within said housing.

11. Apparatus as set forth in claim 10 wherein said water containment means comprises a bag.

* * * * *